United States Patent
Chen et al.

(10) Patent No.: US 8,542,581 B2
(45) Date of Patent: Sep. 24, 2013

(54) SYSTEM AND METHOD FOR EXPOSING MALICIOUS CLIENTS IN WIRELESS ACCESS NETWORKS

(75) Inventors: Shu-Lin Chen, Kanata (CA); Vinod Choyi, Ottawa (CA); Bassem Abdel-Aziz, Kanata (CA)

(73) Assignee: Alcatel Lucent, Paris (FR)

( * ) Notice: Subject to any disclaimer, the term of this patent is extended or adjusted under 35 U.S.C. 154(b) by 686 days.

(21) Appl. No.: 12/212,868

(22) Filed: Sep. 18, 2008

(65) Prior Publication Data

US 2010/0067504 A1    Mar. 18, 2010

(51) Int. Cl.
*H04L 1/00* (2006.01)

(52) U.S. Cl.
USPC .............. 370/230; 370/338; 370/400

(58) Field of Classification Search
USPC .............. 370/230, 230.1, 231, 235, 328–329, 370/335–336, 342–343, 349, 389, 392, 400–401
See application file for complete search history.

(56) References Cited

U.S. PATENT DOCUMENTS

| | | | | |
|---|---|---|---|---|
| 7,028,335 B1* | 4/2006 | Borella et al. | .................. | 726/11 |
| 7,346,025 B2* | 3/2008 | Bryson | ......................... | 370/328 |
| 7,496,094 B2* | 2/2009 | Gopinath et al. | ............. | 370/389 |
| 8,244,211 B2* | 8/2012 | Clark | ............................ | 455/411 |
| 2004/0165588 A1* | 8/2004 | Pandya | ........................ | 370/389 |
| 2004/0172557 A1* | 9/2004 | Nakae et al. | .................. | 713/201 |
| 2005/0037733 A1* | 2/2005 | Coleman et al. | ............. | 455/411 |
| 2006/0184690 A1* | 8/2006 | Milliken | ....................... | 709/238 |
| 2006/0282890 A1* | 12/2006 | Gruper et al. | .................. | 726/22 |
| 2007/0147334 A1* | 6/2007 | Guthrie | ........................ | 370/349 |
| 2007/0261112 A1* | 11/2007 | Todd et al. | ...................... | 726/11 |
| 2008/0005782 A1* | 1/2008 | Aziz | ................................ | 726/3 |
| 2008/0052359 A1* | 2/2008 | Golan et al. | .................. | 709/206 |
| 2008/0155693 A1* | 6/2008 | Mikan et al. | .................... | 726/23 |
| 2008/0273706 A1* | 11/2008 | Noll | ............................. | 380/279 |
| 2008/0282339 A1* | 11/2008 | Nakae et al. | ..................... | 726/13 |
| 2009/0203355 A1* | 8/2009 | Clark | ............................ | 455/411 |
| 2009/0238180 A1* | 9/2009 | Devine et al. | ................. | 370/389 |
| 2009/0240874 A1* | 9/2009 | Pong | ............................ | 711/105 |
| 2009/0262685 A1* | 10/2009 | Schuringa et al. | ............ | 370/328 |
| 2009/0328204 A1* | 12/2009 | Taoka | .............................. | 726/22 |
| 2010/0071054 A1* | 3/2010 | Hart | ................................ | 726/13 |
| 2010/0103842 A1* | 4/2010 | Li | ................................. | 370/254 |

\* cited by examiner

*Primary Examiner* — Kevin Mew

(74) *Attorney, Agent, or Firm* — Garlick & Markison; Holly L. Rudnick

(57) ABSTRACT

Malicious clients within a wireless access network are identified using bait traffic transmitted between a collaborating wireless access point and a collaborating client. The bait traffic entices a malicious client to transmit malicious traffic towards the collaborating wireless access point. Upon receiving the malicious traffic, the collaborating wireless access point is able to identify the malicious client and report the presence of the malicious client within the wireless access network.

20 Claims, 3 Drawing Sheets

SYSTEM AND METHOD FOR EXPOSING MALICIOUS CLIENTS IN WIRELESS ACCESS NETWORKS

BACKGROUND OF THE INVENTION

1. Technical Field of the Invention

The present invention relates in general to wireless access network security, and in particular, to identifying malicious clients in wireless access networks.

2. Description of Related Art

Wireless access points (WAPs or APs) enable wireless communication devices (clients) to connect to a wireless network using Wi-Fi (IEEE 802.11) and other related standards, such as WCDMA/CMDA. The AP may connect not only to a wireless network, but also to a wired network, such as a local area network (LAN), to relay data between the wireless devices and wired devices on the LAN. In either case, the WAP is considered part of a wireless access network that provides access to another network, such as the Internet or a LAN.

For example, in a typical corporate environment, several WAPs are attached to the LAN to provide wireless access to the LAN. Within the range of the WAPs, wireless end users have full network connectivity with the benefit of mobility. In this instance, the WAP functions as a gateway for clients to access the LAN. Another wireless topology consists of a series of APs spread over a large area, each connected to a different network, to provide hot spots where wireless clients can connect to the Internet.

Since anyone within the geographic range of a WAP could conceivably connect to the Internet or LAN through the WAP, security measures have been developed to prevent unauthorized access and protect networks against attackers who send spam, release worms or perform other illegal actions using the wireless access network. The most common way to secure a wireless access network is to allow access only from known, approved MAC addresses. However, this approach provides no security against "sniffing" and client devices can easily spoof MAC addresses.

Another common security feature utilized by WAPs to prevent unauthorized access is wireless traffic encryption. For example, the majority of WAPs today incorporate Wired Equivalent Privacy (WEP) encryption or Wi-Fi Protected Access (WPA or WPA2) authentication (password) security protocols. However, security analysts have demonstrated that WEP protection can easily be broken using tools available to the general public. In addition, if a weak password, such as a dictionary word or short character string is used, WPA and WPA2 can be easily cracked. Even using a long random password may not prevent a sophisticated "sniffer" from breaking the network keys.

Once an attacker gains access to a WAP, the attacker can begin to transmit malicious traffic, such as spam, worms and other undesired traffic onto other networks through the wireless access network. The malicious traffic sent by the attacker increases the burden on the WAP, even if the malicious traffic is later identified and dropped by the network. In addition, since the malicious traffic is mixed with good (normal) traffic, it becomes more difficult to detect stealthy attackers/worms.

SUMMARY OF THE INVENTION

Embodiments of the present invention provide collaborating wireless access points and collaborating clients within a wireless access network that is capable of identifying malicious clients. The collaborating wireless access point includes a transceiver operable to transmit and receive bait traffic to and from a collaborating client. The bait traffic includes messages other than broadcast messages that announce the presence of the collaborating wireless access point to prevent good clients from attempting to associate with the collaborating wireless access point. The transceiver is further operable to receive additional traffic from a source other than the collaborating client. The transceiver provides the additional traffic to a processor operable to determine whether the additional traffic is malicious traffic, and if so, to identify the source as a malicious client.

In one embodiment, the bait traffic includes a first message originated by the collaborating client and a second message generated by the collaborating wireless access point either in response to the first message or automatically without first receiving the first message. In a further embodiment, the malicious traffic also includes a first message originated by the source other than the collaborating client. However, upon receiving the first message, the processor prevents the wireless access point from generating a second message in response to the first message.

In another embodiment, the additional traffic includes an additional message having a spoofed source address identifying the collaborating client. The processor is able to identify the additional traffic as malicious traffic based on the message type or header values within the additional message. In yet another embodiment, the bait traffic includes authentication messages providing encrypted authentication keys, and the additional traffic includes the encrypted authentication keys.

Embodiments of the present invention further provide a wireless access network for identifying a malicious client. The wireless access network includes a collaborating client coupled to transmit and receive bait traffic within the wireless access network and a collaborating wireless access point coupled to transmit and receive the bait traffic to and from the collaborating client. The bait traffic includes messages other than broadcast messages that announce the presence of the collaborating wireless access point to prevent good clients from attempting to associate with the collaborating wireless access point. The wireless access point is further coupled to receive additional traffic from a source other than the collaborating client, and is operable to determine whether the additional traffic is malicious traffic, and if so, to identify the source as a malicious client.

In one embodiment, multiple collaborating clients and multiple collaborating wireless access points are implemented within the wireless access network. Each of the collaborating clients maintains a list of the multiple collaborating wireless access points and each of the collaborating wireless access points maintains a list of the multiple collaborating clients.

In a further embodiment, the wireless access network further includes an administrator node coupled to receive notification from the collaborating wireless access point of the presence of the malicious client in the wireless access network.

Embodiments of the present invention further provide a method for identifying malicious clients within a wireless access network. The method includes transmitting bait traffic between a collaborating client and a collaborating wireless access point, in which the bait traffic including messages other than broadcast messages that announce the presence of the collaborating wireless access point, receiving additional traffic from a source other than the collaborating client at the collaborating wireless access point, determining whether the additional traffic is malicious traffic, and if so, identifying the source as a malicious client and reporting the presence of the malicious client in the wireless access network.

BRIEF DESCRIPTION OF THE DRAWINGS

A more complete understanding of the present invention may be obtained by reference to the following detailed description when taken in conjunction with the accompanying drawings wherein.

DETAILED DESCRIPTION OF THE DRAWINGS

Figure 1:
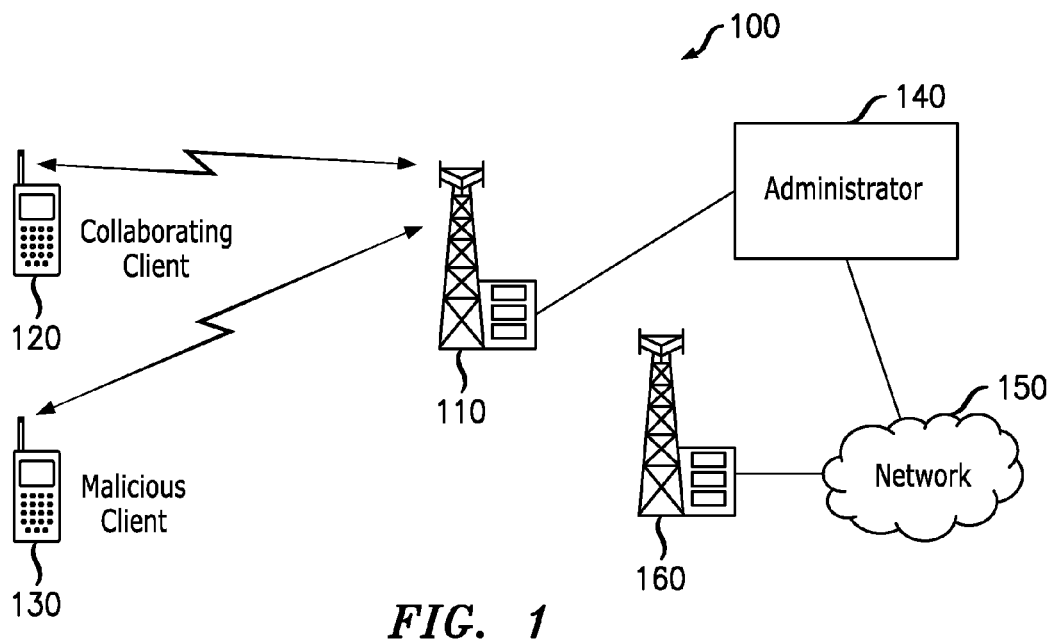
FIG. 1 illustrates an exemplary wireless access network for exposing malicious clients, in accordance with embodiments of the present invention.

Referring to FIG. 1, there is illustrated an exemplary wireless access network 100 capable of implementing various embodiments of the present invention. The wireless access network 100 is a network that enables wireless communication devices (clients) to connect to a wireless network using Wi-Fi and other related standards. For example, in an exemplary embodiment, the wireless access network 100 is a $3^{rd}$ Generation Partnership Project (i.e., 3GPP, 3GPP2, etc.) wireless network operable to serve Internet Protocol (IP)-capable handheld devices, such as cell phones, laptop computers and portable digital assistants (PDAs).

The wireless access network 100 shown in FIG. 1 includes a bait or collaborating wireless access point (CAP) 110 and a bait or collaborating client (CC) 120. In one embodiment, the collaborating WAP 110 and collaborating client 120 are implemented on the same device. In another embodiment, the collaborating WAP 110 and collaborating client 120 are stand-alone devices positioned within the wireless access network 100 to be in wireless communication with each other.

The collaborating WAP 110 and collaborating client 120 are "fake" network nodes that operate to lure attackers, such as malicious client 130, to send malicious traffic to the fake WAP 110. For example, the collaborating client 120 can send bait traffic to the collaborating WAP 110, such as set-up/tear-down messages, and the collaborating WAP 110 can respond to the bait traffic from the collaborating client 120 as if the collaborating WAP 110 is an actual WAP in service. The collaborating client 120 is configured with the collaborating WAP's station identity and any other authentication/encryption keys needed to initiate communications with the collaborating WAP. In addition, the collaborating WAP 110 is configured with the collaborating client's address (e.g., Media Access Control (MAC) address) to initiate communications with the collaborating client 120.

However, the collaborating WAP 110 does not send out any broadcast-type messages to announce itself to the network 100. Therefore, good (real) clients will not notice the presence of the collaborating WAP 110 because there is no beacon message transmitted from the WAP 110. Also, the collaborating WAP 110 does not respond to any message from a client that is not the collaborating client 120. In general, the collaborating client 120 can send any type of message to the collaborating WAP 110, either a broadcast message or unicast message, as long as the message includes set pre-agreed values (such as message type, header values, etc.) in the message. For example, the collaborating client 120 can send a "probe/association request" message to the collaborating WAP.

The collaborating WAP 110, on the other hand, sends only unicast messages to the collaborating client 120. For example, the collaborating WAP can send a "probe/association response" message to the collaborating client either in response to a "probe/association request" message received from the collaborating client 120 or spontaneously without first receiving a request message from the collaborating client 120. The collaborating WAP 110 does not broadcast any message to announce its presence, nor does it respond to any message from clients other than the collaborating client 120. For example, the collaborating WAP 110 does not respond to any message that appears to be from the collaborating client 120, but does not include the correct pre-agreed values within the message. In this way, the collaborating WAP 110 is able to identify a malicious client 130 who is "spoofing" the address of the collaborating client 120.

Sniffing attackers/worms, such as malicious client 130, are able to capture the traffic between the collaborating client 120 and the collaborating WAP 110 and determine that the collaborating WAP 110 is present in the network 150. If the malicious client 130 then sends traffic towards the collaborating WAP 110, the collaborating WAP 110 raises an alarm/flag that indicates that there are malicious/infected clients 130 within the network. For example, if the collaborating WAP 110 receives a message from a MAC address other than the MAC address of the collaborating client 120, the collaborating WAP raises an alarm/flag. If the collaborating WAP 110 receives a message from the MAC address of the collaborating client 120, but the message includes values that are different from the pre-set and agreed-upon values, the collaborating WAP 110 raises the alarm/flag.

However, not all traffic received at the collaborating WAP 110 is considered "malicious." For example, a probe request message broadcast from a source other than the collaborating client 120 would normally be considered a valid or "good" message. In this case, the client is trying to determine whether there are any access points present, and therefore, the message is not directed specifically to the collaborating WAP 110. In general, broadcasted messages from any client are generally considered non-malicious. However, traffic sent from a non-collaborating client specifically targeting the collaborating WAP 110 would normally be considered malicious. For example, a request to set up a connection specifically directed towards the collaborating WAP 110 would raise an alarm/flag at the collaborating WAP 110.

Upon detecting the presence of a malicious client 130, the collaborating WAP 110 can notify an administrator node 140 within the network 150 of the existence of the malicious client 130. For example, the collaborating WAP 110 can provide the identity of the malicious client 130, if known, or the signature of the malicious traffic, if the identity is unknown (e.g., in the case of a "spoofed" address). The signature may be, for example, the type of packet sent out by the malicious client, the contents of the packet, the rate at which the packets are sent and the frequency. In addition, the collaborating WAP 110 may also be able to provide the location (based on triangulation or GPS) of the malicious client 130. The administrator node 140 can then take steps to identify and/or locate the malicious client 130 to prevent the malicious client 130 from accessing "real" WAPs within the wireless access network 150. By luring malicious clients 130 to attack/connect to a preselected "fake" WAP 110, malicious traffic is not mixed with good traffic, making it easier to identify malicious traffic even if the malicious client 130 is stealthy.

As further shown in FIG. 1, the collaborating client 120 and collaborating WAP 110 can be implemented alongside a genuine WAP 160. The genuine WAP 160 may be, for example, a short-range wireless fidelity (WiFi) access point (APs), base station or "hot spot." The genuine WAP 160 may further be coupled to a network 150 to provide wireless clients with the ability to connect to the network 150.

Network 150 is illustrative of a network infrastructure that can include, among others, any wireline, wireless, satellite, or cable network arrangement, or a combination thereof. In one implementation, network 150 may comprise a public packet-switched network such as the Internet that is accessible via suitable access means including both narrowband (e.g., dial-up) and broadband (e.g., cable, digital subscriber line or DSL, etc.) access mechanisms through the WAP. Alternatively, network 150 may be implemented as a private enterprise-level intranet, such as a local area network (LAN). Network 150 may also be implemented as a wireless packet data service network, such as the General Packet Radio Service (GPRS) network, that provides packet radio access for mobile devices using the cellular infrastructure of a Global System for Mobile Communications (GSM)-based carrier network. It should be understood that embodiments of the present invention apply to any particular wireless or wireline network implementation of the network 150.

Figure 2:
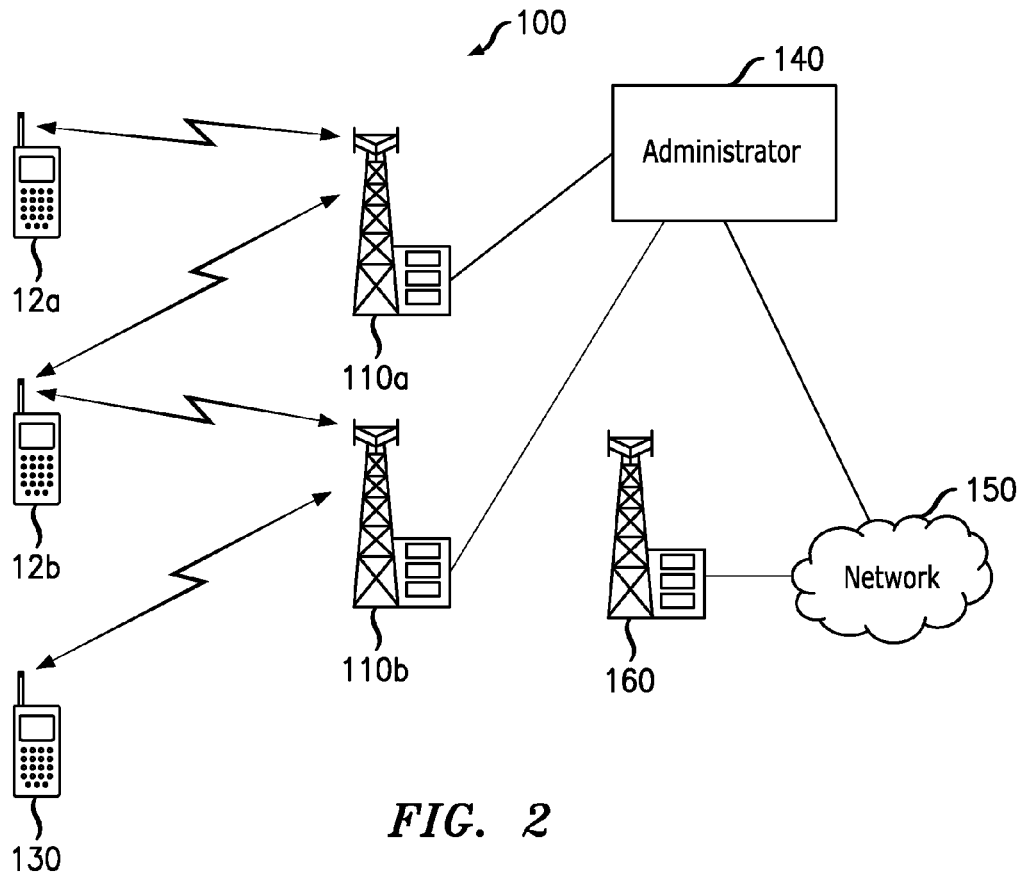
FIG. 2 illustrates another exemplary wireless access network for exposing malicious clients, in accordance with embodiments of the present invention.

FIG. 2 illustrates another exemplary wireless access network 100 for exposing malicious clients, in accordance with embodiments of the present invention. In FIG. 2, multiple collaborating clients 120a and 120b and multiple collaborating WAPs 110a and 110b are used to lure malicious clients 130 into attacking the collaborating WAPs 110a and 110b. Each collaborating client 120a and 120b is configured with a list of collaborating WAPs 110a and 110b and associated station identities and authentication/encryption keys to enable the collaborating clients 120a and 120b to initiate and respond to communications with each of the collaborating WAPs 110a and 110b. Similarly, each collaborating WAP 110a and 110b is configured with a list of collaborating clients 120a and 120b and associated addresses to enable the collaborating WAPs 110a and 110b to initiate and respond to communications with each of the collaborating clients 120a and 120b.

In an exemplary embodiment, a collaborating WAP, e.g., WAP 110a, can send the same message to multiple collaborating clients 120a and 120b by generating multiple messages of the same type, accessing the list of collaborating clients stored within the WAP 110a to determine the MAC address for each collaborating client and populating the MAC address of each collaborating client into a respective one of the messages. In another exemplary embodiment, the collaborating WAP 110a can include different values into the same message sent to each client 120a and 120b. This enables the collaborating WAP 110a to establish different pre-set values for each collaborating client 120a and 120b, which may serve to convince a malicious client 130 that the collaborating WAP 110a is a genuine WAP, and therefore, further entice the malicious client 130 to attack the collaborating WAP 110a and not to attack a genuine WAP 160 within the wireless access network 100.

Likewise, a collaborating client, e.g., CC 120a, can send the same message to multiple collaborating WAPs 110a and 110b by generating multiple messages of the same type, accessing the list of collaborating WAPs stored within the CC 120a to determine the station identity for each WAP and populating the station identity of each collaborating WAP into a respective one of the messages. In another exemplary embodiment, the collaborating client 120a can include different values into the same message sent to each WAP 110a and 110b, depending upon the respective pre-set values agreed upon between the CC 120a and the WAPs 110a and 110b.

Figure 3:
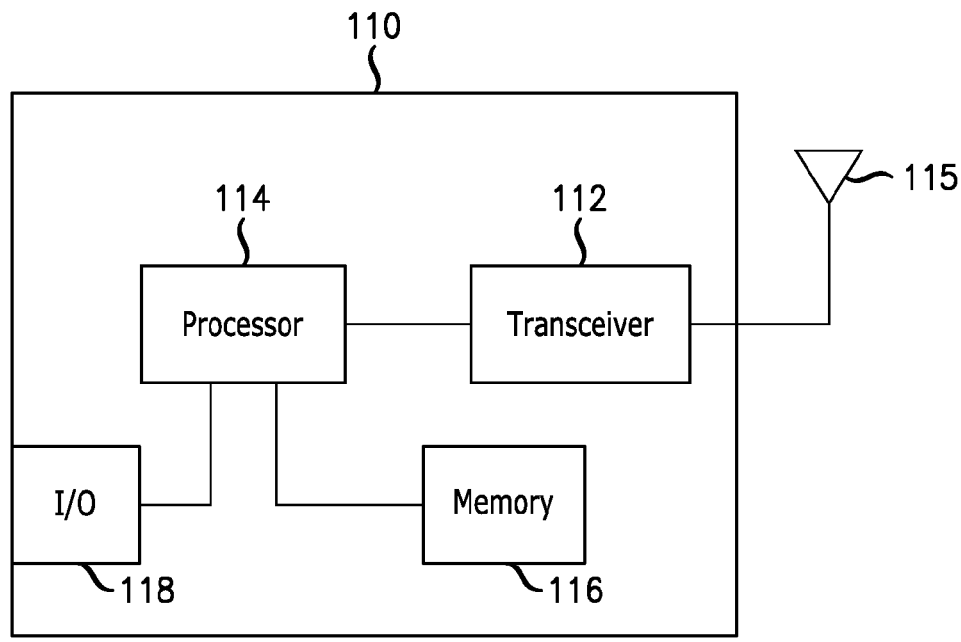
FIG. 3 is a block diagram of a collaborating wireless access point capable of identifying malicious clients, in accordance with embodiments of the present invention.

FIG. 3 is a block diagram of a collaborating wireless access point (CAP) 110 capable of identifying malicious clients, in accordance with embodiments of the present invention. The CAP 110 includes a transceiver 112, processor 114, memory 115, I/O interface 118 and antenna 115. The transceiver 112 includes a receiver section and a transmitter section, each not specifically shown. The transmitter typically includes a data modulation stage, one or more intermediate frequency stages, and a power amplifier. The data modulation stage converts raw data into baseband signals in accordance with a particular wireless communication standard. The one or more intermediate frequency stages mix the baseband signals with one or more local oscillations to produce RF signals. The power amplifier amplifies the RF signals prior to transmission via the antenna 115.

The receiver is coupled to the antenna 115 and includes a low noise amplifier, one or more intermediate frequency stages, a filtering stage, and a data recovery stage. The low noise amplifier receives inbound RF signals via the antenna and amplifies then. The one or more intermediate frequency stages mix the amplified RF signals with one or more local oscillations to convert the amplified RF signal into in-phase and quadrature-phase (IQ) baseband signals or intermediate frequency (IF) signals. The filtering stage filters the IQ baseband signals or the IF signals to attenuate unwanted out of band signals to produce filtered signals. The data recovery stage recovers raw data from the filtered signals in accordance with the particular wireless communication standard. For instance, the wireless communication standard may be IEEE 802.11, Bluetooth, advanced mobile phone services (AMPS), digital AMPS, global system for mobile communications (GSM), code division multiple access (CDMA), local multipoint distribution systems (LMDS), multi-channel-multipoint distribution systems (MMDS), and/or variations thereof.

The processor 114 is coupled to provide the raw outbound data to the transceiver 112 for transmission via antenna 115 to one or more collaborating clients. In addition, the processor 114 is coupled to receive the raw inbound data from the transceiver 112 and is operable to process the raw inbound data to determine whether a malicious client is present in the network. The memory 116 maintains a list of collaborating clients and associated addresses for the collaborating clients, pre-set values for messages transmitted to/from collaborating clients, sequences of messages to be transmitted to/from collaborating clients and any other information that can be used by the processor 114 to identify malicious clients in the network.

For example, in one embodiment, the processor 114 is coupled to the memory 116 to retrieve instructions for processing the raw inbound data (i.e., the received message), along with criteria (e.g., collaborating client addresses, pre-set message values, pre-set message sequences, etc.) for use in determining whether the received message was originated by a collaborating client or a malicious client. Once the processor 114 identifies the presence of a malicious client in the network, the processor 114 transmits a notification message to the network administrator via the I/O interface 118. The notification message includes the MAC address of the malicious client or the signature and/or location (based on triangulation or GPS) of the malicious client (if the MAC address was spoofed) for use by the administrator in locating and/or neutralizing the malicious client.

The processor 114 may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory 116 may be a single memory device or a plurality of memory devices. Such a memory device may be a read-only memory, random access memory, volatile memory, non-volatile memory, static memory, dynamic memory, flash memory, and/or any device that stores digital information. Note that when the processor 114 implements one or more of its functions via a state machine, analog circuitry, digital circuitry, and/or logic circuitry, the memory 116 storing the corresponding operational instructions is embedded with the circuitry comprising the state machine, analog circuitry, digital circuitry, and/or logic circuitry.

Figure 4:
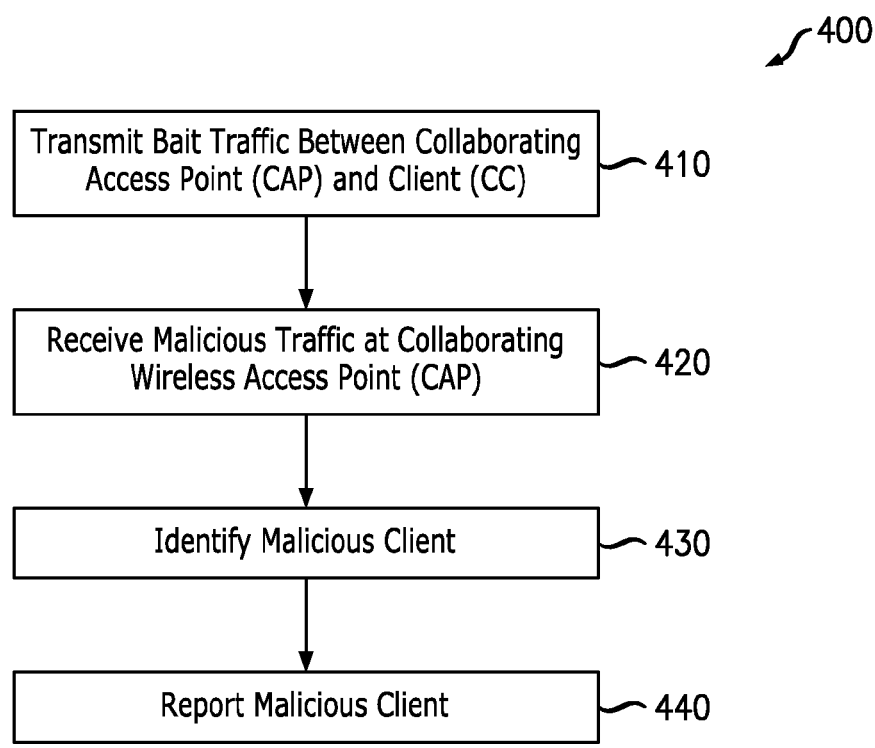
FIG. 4 is a flowchart illustrating an exemplary process for identifying malicious clients in a wireless access network, in accordance with embodiments of the present invention.

FIG. 4 illustrates an exemplary process 400 for identifying malicious clients in a wireless access network, in accordance with embodiments of the present invention. Initially, at block 410, bait traffic is transmitted between a collaborating wireless access point (CAP) and a collaborating client (CC). The bait traffic includes a message or sequence of messages transmitted between the CAP and CC. By way of example, but not limitation, the bait traffic can include request and response messages (e.g., probe request/response messages, set-up messages and other types of messages) or authentication/handshake messages. However, the bait traffic does not include any broadcast or beacon messages transmitted by the CAP in order to avoid attracting "good" clients to the CAP.

At block 420, the CAP receives traffic from a source other than the CC. The traffic may be broadcast traffic transmitted by a "good" client, which is not malicious, or unicast traffic transmitted by a malicious client that is malicious. The CAP can identify the malicious traffic based on the MAC address of the originating client, based on the type of message received or based on the message values within the message itself. For example, if the CAP receives a message destined for the CAP (a unicast message) from a source other than a collaborating client, the CAP can determine that the message is malicious traffic, since a "good" client would not be sending a unicast message to the CAP. As another example, if the CAP receives a message that is out of order, not within the pre-set sequence of messages transmitted between the CAP and CC or includes values that are different from the pre-set message values, the CAP can determine that the message is malicious traffic, even if the MAC address is spoofed.

Once the CAP determines that it has received malicious traffic, at block 430, the CAP identifies the malicious client that originated the malicious traffic. For example, the CAP can identify the malicious client based on the MAC address included in the message, if the MAC address is not spoofed. If the MAC address is spoofed (i.e., the message includes the MAC address of a collaborating client), the CAP can identify the malicious client based on the signature and/or location (as determined from triangulation of the signal source or GPS measurements). At block 440, the CAP reports the presence and identity of the malicious client to the network administrator for use in locating and/or neutralizing the malicious client.

Figure 5:
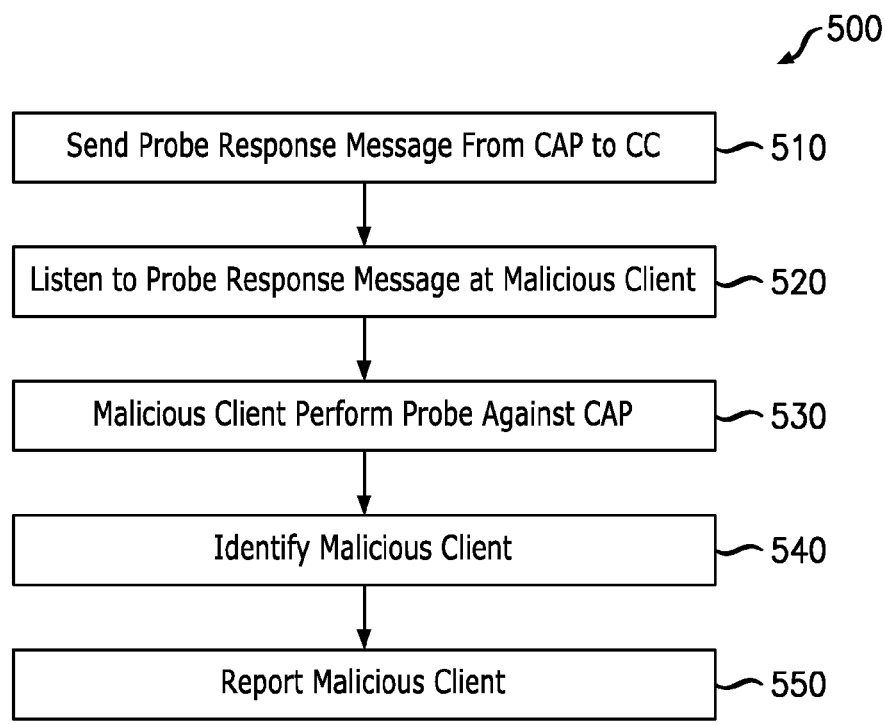
FIG. 5 is a flowchart illustrating another exemplary process for identifying malicious clients in a wireless access network, in accordance with embodiments of the present invention.

FIG. 5 is a flowchart illustrating another exemplary process 500 identifying malicious clients in a wireless access network, in accordance with embodiments of the present invention. At block 510, a probe response message is transmitted from a collaborating Wireless Access Point (CAP) to a collaborating client (CC) in the wireless access network. At block 520, a malicious client (attacker/worm) listens to the probe response message, and at block 530, performs a probe against the CAP looking for open ports and vulnerabilities in the CAP. The malicious client may perform the probe immediately upon "sniffing" the probe response message or may record the address of the CAP and perform a stealth scan later on.

Once the CAP receives any messages from a client that is not listed in its list of collaborating clients, at block 540, the CAP realizes that the sender of the message is potentially a malicious client (worm) and can identify the malicious client. Even if a MAC address is spoofed taking the value of the collaborating client's address, the CAP is able to determine the presence of a malicious client by analyzing the type of message and/or values in the message headers and comparing the received message type and message values to the expected message type and message values as agreed upon between the collaborating client and collaborating WAP. The CAP identifies the malicious client based on the MAC address included in the message or based on the signature and/or location of the malicious client (as determined from triangulation of the signal source or GPS measurements). At block 550, the CAP reports the presence and identity of the malicious client to the network administrator for use in locating and/or neutralizing the malicious client.

Figure 6:
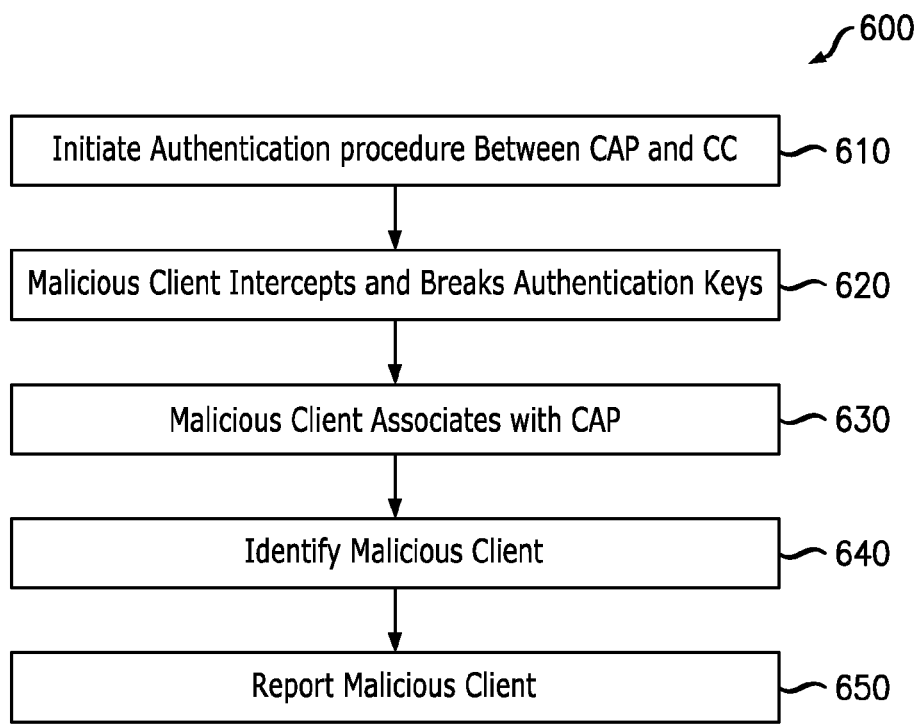
FIG. 6 is a flowchart illustrating yet another exemplary process for identifying malicious clients in a wireless access network, in accordance with embodiments of the present invention.

FIG. 6 is a flowchart illustrating yet another exemplary process 600 for identifying malicious clients in a wireless access network, in accordance with embodiments of the present invention. Malicious clients that wait for "interesting" messages before launching attacks, such as Man In The Middle (MITM) attacks, can be identified by sending authentication messages or performing handshakes between the CAP and the CC. Specifically, at block 610, an authentication procedure is initiated between the CAP and the CC. For example, the CC can initiate an authentication procedure with the CAP by sending Extensible Authentication Protocol (EAP) messages.

At block 620, the malicious client on seeing the various EAP messages intercepts the messages and attempts to break the encrypted authentication keys or guess the keys. The malicious client may wait for further re-authentication procedures before trying to break the keys. In one embodiment, the keys that are negotiated between the CAP and the CC are weaker keys to entice the malicious client to break them. Once the malicious client has the keys, at block 630, the malicious client can attempt to associate with the CAP.

When the CAP receives a message from a client that is not listed in the sequence of messages or from a MAC that is not listed in its list of collaborating clients, at block 640, the CAP identifies the client as a malicious client, and at block 650, the CAP reports the presence and identity of the malicious client (e.g., the MAC address or signature and/or location) to the network administrator for use in locating and/or neutralizing the malicious client.

As will be recognized by those skilled in the art, the innovative concepts described in the present application can be modified and varied over a wide rage of applications. Accord-

We claim:

1. A collaborating wireless access point within a wireless access network, comprising:
   a transceiver operable to transmit and receive bait traffic to and from a collaborating client via a direct wireless connection therebetween, the bait traffic including messages other than broadcast messages that announce the presence of the transceiver, the transceiver being further operable to receive additional traffic directly and wirelessly from a source other than the collaborating client in response to the bait traffic; and
   a processor coupled to receive the additional traffic and operable to determine whether the additional traffic is malicious traffic, and if the additional traffic is malicious traffic, to identify the source as a malicious client.

2. The wireless access point of claim 1, wherein the additional traffic includes a first message originated by the source other than the collaborating client, and wherein the processor is operable to prevent the generation of a second message in response to the first message.

3. The wireless access point of claim 1, wherein the bait traffic includes a request message originated by the collaborating client and a response message generated in response to the request message transmitted from collaborating client.

4. The wireless access point of claim 1, wherein the bait traffic includes a first message transmitted from the wireless access point to the collaborating client that is generated without first receiving an initial message from the collaborating client.

5. The wireless access point of claim 1, wherein the transceiver is further operable to transmit and receive bait traffic to and from multiple collaborating clients, and further comprising:
   a memory maintaining a list of the multiple collaborating clients and an associated address for each of the multiple collaborating clients.

6. The wireless access point of claim 1, wherein the additional traffic includes an additional message having a spoofed source address identifying the collaborating client, the processor being operable to identify the additional traffic as malicious traffic based on a message type or header values within the additional message.

7. The wireless access point of claim 1, wherein the bait traffic includes authentication messages providing encrypted authentication keys, the additional traffic including the encrypted authentication keys.

8. The wireless access point of claim 1, further comprising:
   an interface to an administrator node within the wireless network, the processor being operable to notify the administrator node of the presence of the malicious client in the wireless access network via the interface by providing an address of the malicious client or a signature of the malicious traffic.

9. A wireless access network for identifying a malicious client, comprising:
   a collaborating client coupled to transmit and receive bait traffic within the wireless access network; and
   a collaborating wireless access point coupled to transmit and receive the bait traffic to and from the collaborating client via a direct wireless connection therebetween, the bait traffic includes messages other than broadcast messages that announce the presence of the collaborating wireless access point, and further coupled to receive additional traffic directly and wirelessly from a source other than the collaborating client in response to the bait traffic, the collaborating wireless access point being operable to determine whether the additional traffic is malicious traffic, and if the additional traffic is malicious traffic, to identify the source as a malicious client.

10. The wireless access network of claim 9, further comprising:
    a device including the collaborating client and the collaborating wireless access point.

11. The wireless access network of claim 9, wherein the additional traffic includes a first message originated by the source other than the collaborating client, and wherein the wireless access point is operable to prevent the generation of a second message in response to the first message.

12. The wireless access network of claim 9, further comprising:
    multiple collaborating clients; and
    multiple collaborating wireless access points;
    wherein each of the collaborating clients maintains a list of the multiple collaborating wireless access points and each of the collaborating wireless access points maintains a list of the multiple collaborating clients.

13. The wireless access network of claim 9, wherein the additional traffic includes an additional message having a spoofed source address identifying the collaborating client, the wireless access point being operable to identify the additional traffic as malicious traffic based on a message type or header values within the additional message.

14. The wireless access network of claim 9, wherein the bait traffic includes authentication messages providing encrypted authentication keys, the additional traffic including the encrypted authentication keys.

15. The wireless access network of claim 9, further comprising:
    an administrator node coupled to receive a notification from the wireless access point of the presence of the malicious client in the wireless access network, the notification including an address of the malicious client or a signature of the malicious traffic.

16. A method for identifying malicious clients within a wireless access network, comprising:
    transmitting bait traffic between a collaborating client and a collaborating wireless access point via a direct wireless connection therebetween, the bait traffic including messages other than broadcast messages that announce the presence of the collaborating wireless access point;
    receiving additional traffic from a source other than the collaborating client at the collaborating wireless access point;
    determining whether the additional traffic is malicious traffic;
    if the additional traffic is malicious traffic, identifying the source as a malicious client; and
    reporting the presence of the malicious client in the wireless access network by providing an address of the malicious client or a signature of the malicious traffic.

17. The method of claim 16, wherein the additional traffic includes a first message originated by the source other than the collaborating client, and further comprising:
    preventing the generation of a second message by the wireless access point in response to the first message.

18. The method of claim 16, wherein the bait traffic includes a first message transmitted from the wireless access point to the collaborating client, and further comprising:
    generating the first message by the wireless access point without first receiving a initial message from the collaborating client.

19. The method of claim 16, wherein the additional traffic includes an additional message having a spoofed source address identifying the collaborating client, and wherein the step of determining the additional traffic is malicious traffic further comprises:
   identifying the additional traffic as malicious traffic based on a message type or header values within the additional message.

20. The method of claim 16, wherein the bait traffic includes authentication messages providing encrypted authentication keys, the additional traffic including the encrypted authentication keys.

* * * * *